United States Patent [19]
O'Connor

[11] Patent Number: 6,072,808
[45] Date of Patent: Jun. 6, 2000

[54] METHOD OF PROVIDING AND RETRIEVING A DATA SEGMENT

[75] Inventor: Dennis M. O'Connor, Chandler, Ariz.

[73] Assignee: Intel Corporation, Santa Clara, Calif.

[21] Appl. No.: 08/997,501

[22] Filed: Dec. 23, 1997

[51] Int. Cl.[7] .................................................... H04H 1/04
[52] U.S. Cl. ............................................ 370/486; 370/468
[58] Field of Search ..................................... 370/485, 486, 370/489, 522, 465, 468; 348/6, 7, 8, 10

[56] References Cited

U.S. PATENT DOCUMENTS 5,594,491  1/1997  Hodge et al. ................................. 378/7

*Primary Examiner*—Chi H. Pham
*Assistant Examiner*—Kim T. Nguyen
*Attorney, Agent, or Firm*—Charles K. Young

[57] ABSTRACT

A data segment is provided with minimal access latency. The data segment is divided into three or more portions and provided via two or more channels. Each of the channels carries a portion of the data segment, the portion of the data segment carried by each channel being less than the entire data segment. Each of the channels repeat over time. In one embodiment, the two or more channels are physical channels. In another embodiment, the two or more channels are logical channels which are time-multiplexed over a single physical channel.

24 Claims, 8 Drawing Sheets

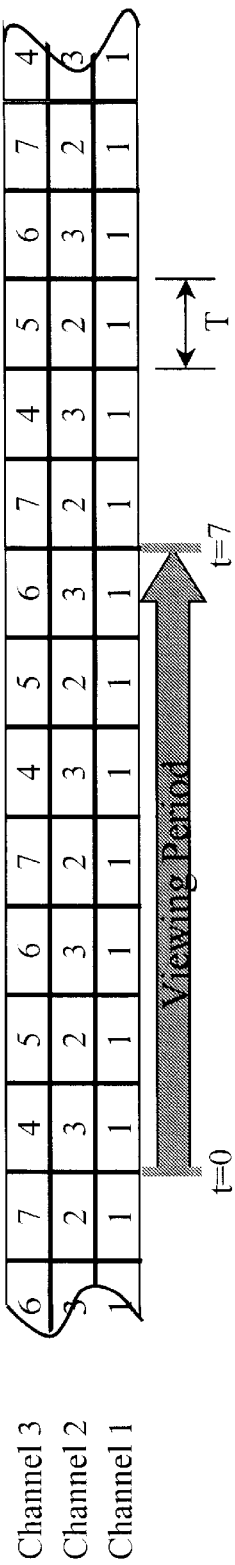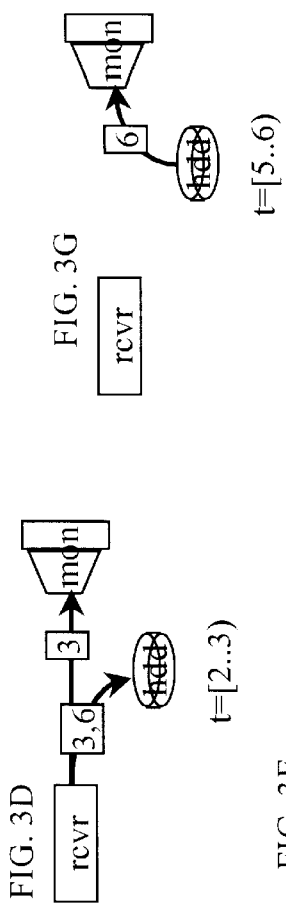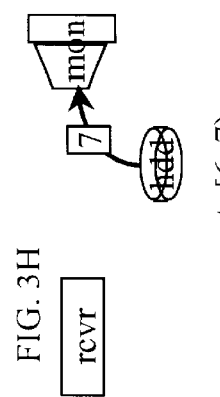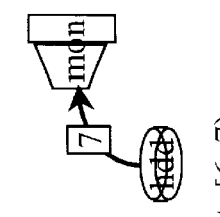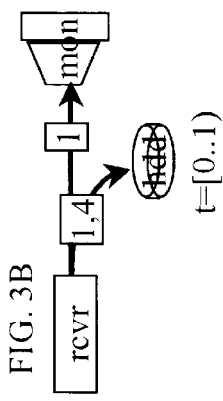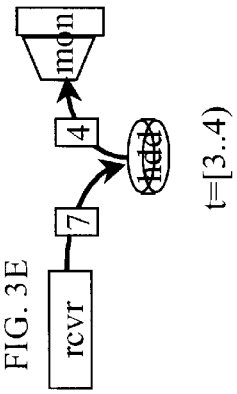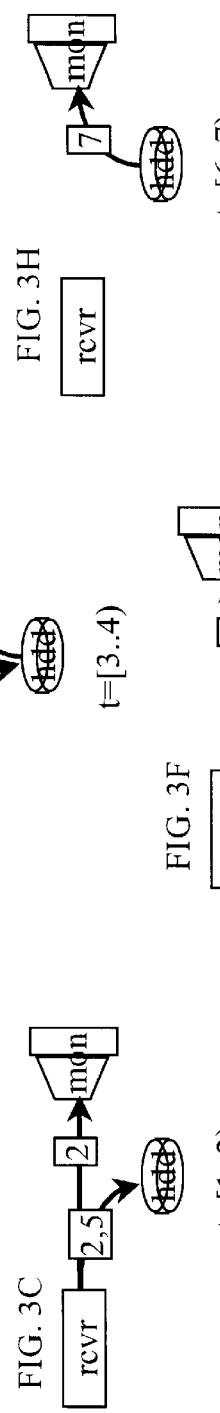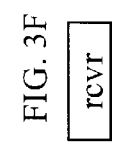

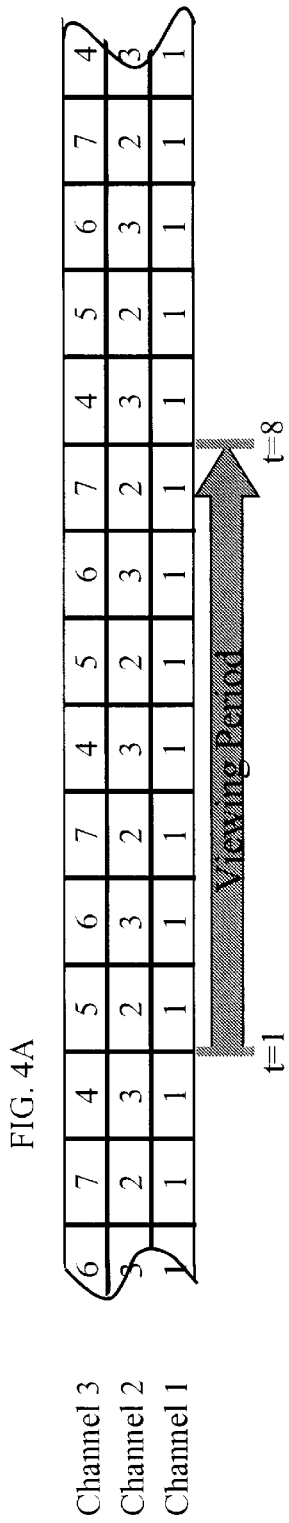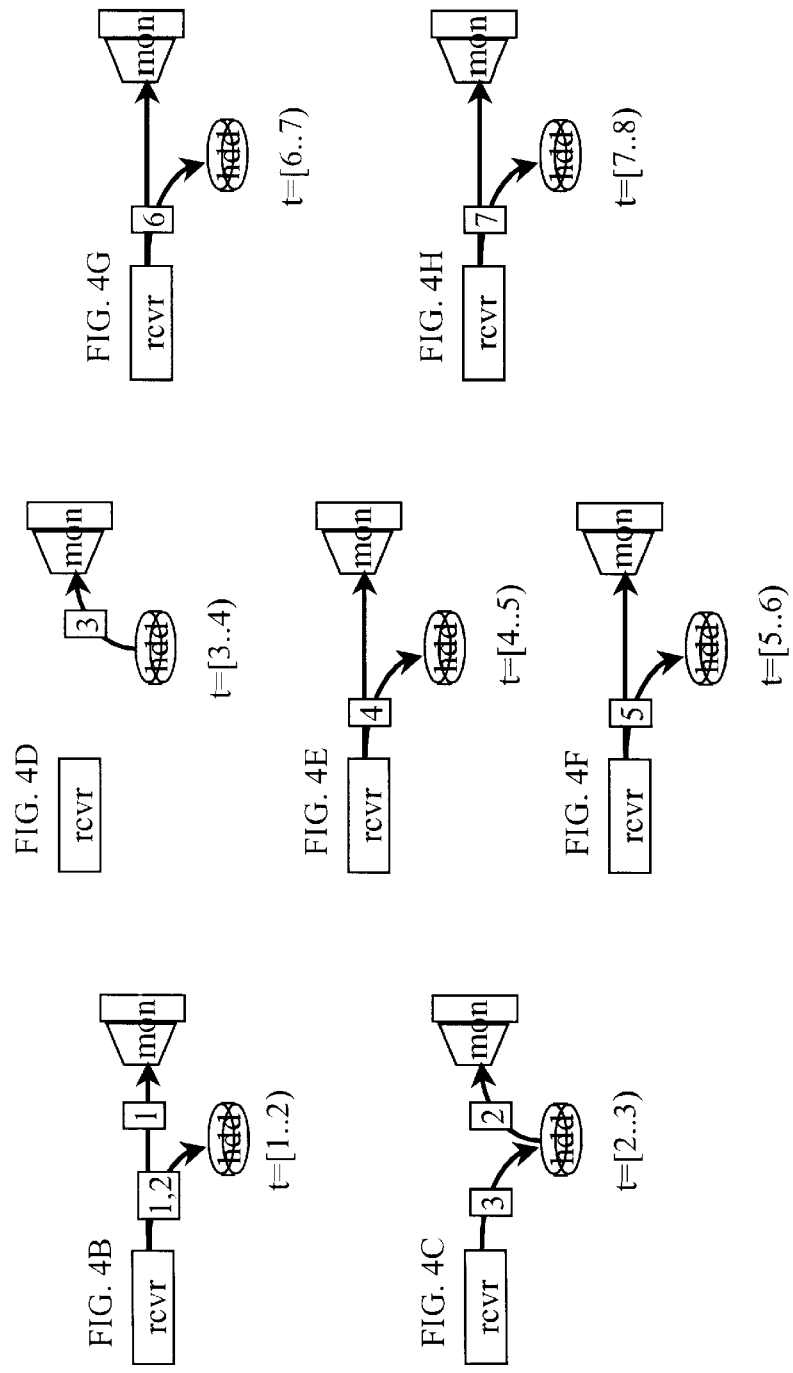

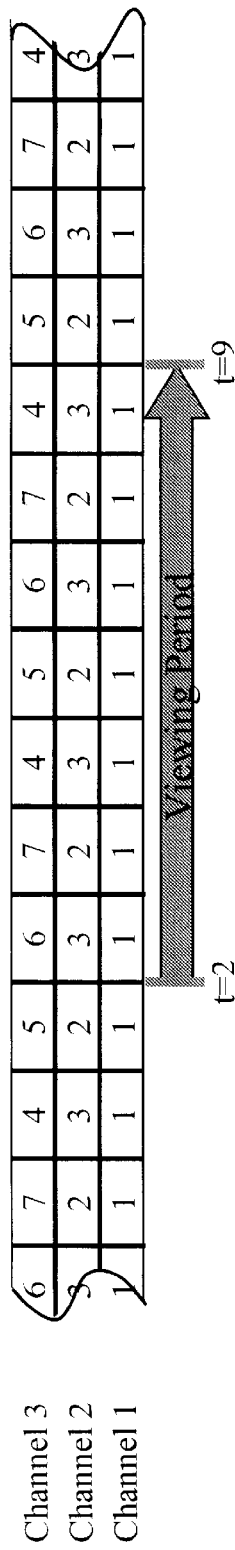
FIG. 5A
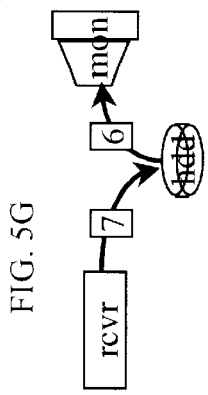
FIG. 5B
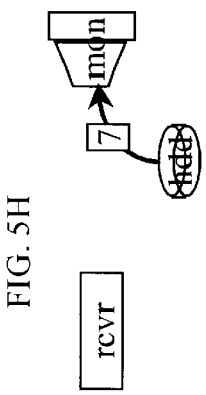
FIG. 5C
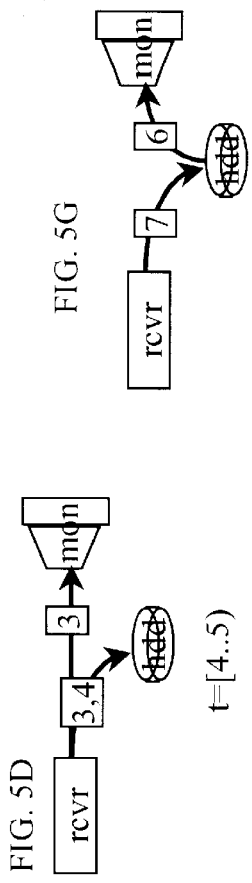
FIG. 5D  FIG. 5E  FIG. 5F
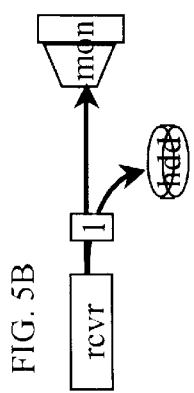
FIG. 5G
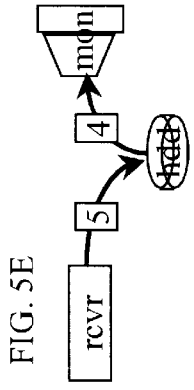 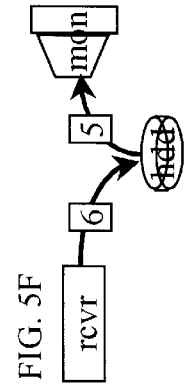
FIG. 5H

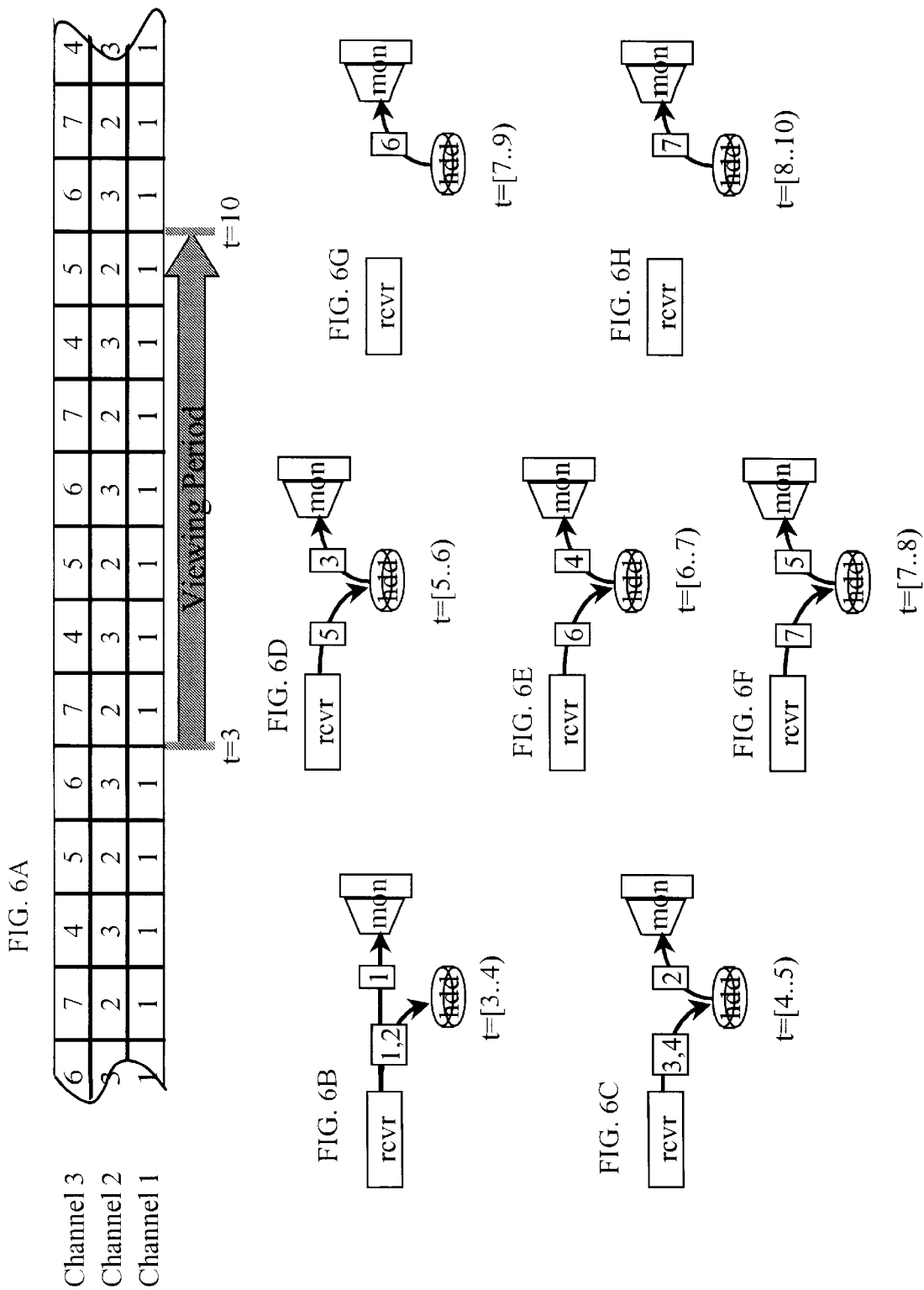

METHOD OF PROVIDING AND RETRIEVING A DATA SEGMENT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The described invention relates to the field of data storage and transmission. In particular, the invention relates to a method of providing a data segment with minimal access latency. A data segment is defined herein as a sequential data stream of finite length. The data segment includes, but is not limited to, any combination of audio and/or video data.

2. Description of Related Art

On-demand systems are employed in various settings. For example, on-demand movies are shown on cable television and on private television networks, such as those found in a hotel. The cable company and the hotel are able to provide the video to a user upon the request of the user (on-demand). On-demand systems use a back channel to provide a signal to the cable provider's or hotel's video server to begin providing the on-demand movie. The back channel may be accessed using a remote control to transmit information of the user's request to a television set or set-top box, which in turn provides a signal to the video server. Alternatively, the user may call via telephone (the back channel) to order a movie. The movie will then be broadcast for the user to view.

Near-on demand refers to a system which may not begin immediately at the request of the user. Instead, the near-on demand system repeats at intervals that are short enough to be acceptable to the user. The user no longer needs to use a back channel to indicate that he wishes to access the data segment. Instead, he just waits for the data segment to restart in order to view the data segment from the beginning.

One way of providing a data segment using a near-on-demand system is by providing the entire data segment on multiple channels, each channel offset by a fixed time interval. For example, if a data segment is two hours long, four channels (with offsets of 0, 30, 60, and 90 minutes) would adequately allow for a person to access the data segment from the beginning every 30 minutes. The user can tune in to the channel that is next to restart the data segment from the beginning. However, this method takes many channels to reduce to a reasonable amount the access latency, i.e., the maximum waiting period until the data segment is restarted. In the above example, using four channels, a person may need to wait up to 30 minutes for the data segment to restart. This amount of time may be unacceptable to many users.

SUMMARY OF THE INVENTION

A method of providing a data segment is disclosed. The data segment is divided into three or more portions and provided via two or more channels. Each of the channels carries a portion of the data segment, the portion of the data segment carried by each channel being less than the entire data segment. Each of the channels repeat over time.

In one embodiment, the two or more channels are physical channels. In another embodiment, the two or more channels are logical channels which are time-multiplexed over a single physical channel.

A method of accessing the data segment provided as discussed above is also disclosed. Additionally, a device that stores a data segment using two or more channels is disclosed.

BRIEF DESCRIPTION OF THE DRAWINGS

FIG. 3A shows an embodiment in which a data segment has been divided into portions of equal length.

FIGS. 3B–3H show pictorially what the hardware does for one embodiment during various time intervals corresponding to t=0 to t=7, as shown in FIG. 3A.

FIGS. 4A–4H show pictorially what the hardware does to access the same data segment of FIGS. 3A–3H one time interval later.

FIGS. 5A–5H show pictorially what the hardware does to access the same data segment of FIGS. 3A–3H two time intervals later.

FIGS. 6A–6H show pictorially what the hardware does to access the same data segment of FIGS. 3A–3H three time intervals later.

DETAILED DESCRIPTION

Figure 1:
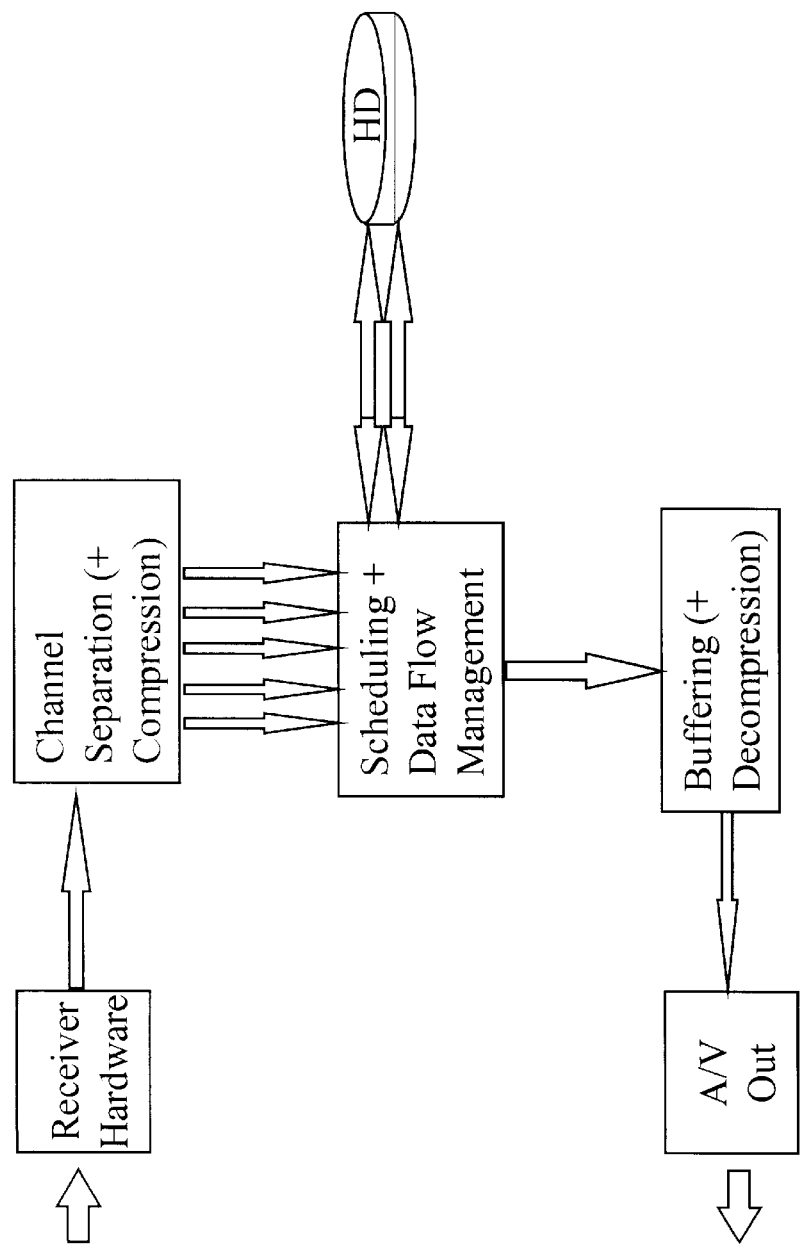
FIG. 1 is a block diagram illustrating the hardware used for accessing a data segment provided over two or more channels.

A method of providing a data segment with minimal access latency is described. The invention uses hardware that is able to simultaneously record one or more channels while another channel is being viewed directly or played back from storage. One example of such hardware is in copending patent application entitled "Method of Time Shifting to Simultaneously Record and Play A Data Stream," Serial No. 08/996,535, filed concurrently with this application and assigned to the same corporate assignee. However, other such hardware can be constructed to provide record and playback capability based off of different channels.

The invention provides a way of accessing a data segment with minimal access latency. This is accomplished by providing the first portion of the data segment on a first channel that is repeated at a high rate of frequency. Thus, a user will not have to wait long to begin accessing the first portion of the data stream.

While the user is accessing the first portion of the data stream, the user can also record subsequent portions of the data segment which are being provided on other channels. In this way, the user is able to access either a portion of the data segment directly from one of the channels, or a portion of the data segment that has been buffered to a storage unit.

The channels are arranged to provide data in such a way that it is possible to provide the entire data segment from the beginning to end at the same rate of frequency that the first portion of the data segment is provided.

An example is helpful to describe how the channels can be set up to take advantage of the present invention. FIG. 3A shows an embodiment in which a data segment has been divided into portions of equal length. In this particular case, he data segment is divided into seven portions, sequentially numbered from 1 to 7. The portions are divided among various channels. In this example, the portions are divided among three separate channels.

On channel 1, portion 1 is repeated over and over again. At each time interval, T, which in this case, is one seventh of the length of the data segment, portion 1 repeats.

On channel 2, portions 2 and 3 are repeated. After every two time intervals, T, portion 2 repeats. Portion 3 follows portion 2.

On channel 3, portions 4, 5, 6, and 7 are repeated. After every four time intervals, T, portion 4 repeats. The rest of the portions follow each other sequentially.

In one embodiment, index information precedes each portion indicating which portion of the data segment follows. In the example of FIG. 3A, the index information identifies which of the portions 1 to 7 is being provided on a particular channel). There are numerous ways of providing this type of index information. For example, the index information may be embedded in the data segment itself, such as a time index of the data segment. Alternatively, the receiver may be able to determine which portion of the data segment is being provided by knowing the time schedule according to which the portions are provided on the channels.

FIGS. 3B–3H show pictorially what the hardware does for one embodiment during various time intervals corresponding to t=0 to t=7, as shown in FIG. 3A. FIGS. 3B–3H show an output device and a storage device. In this example, portions of the data segment are provided to the output device. They are provided directly from a receiver (rcvr), or they are provided from a storage device. Portions of the data segment are also stored to the storage device during various time intervals. In this example, the output device is a monitor (mon), and the storage device is a hard disk (hdd).

FIG. 3B shows pictorially what the hardware does during the first time interval t=[0 . . . 1): The portion 1 is sent to the monitor while portion 4 is saved to the storage device. NOTE: The time notation above uses a left bracket to indicate time inclusive of the end point; the right parenthesis indicates time non-inclusive of the end point. However, this is meant to be an example only; the exact cut off times for a portion being included or not included in a particular time interval T, may vary by implementation.

FIG. 3C shows pictorially what the hardware does during the second time interval t=[1 . . . 2): The portion 2 is displayed to the monitor while portion 5 is saved to the storage device.

FIG. 3D shows pictorially what the hardware does during the third time interval t=[2 . . . 3): The portion 3 is displayed to the monitor while portion 6 is saved to the storage device.

FIG. 3E shows pictorially what the hardware does during the fourth time interval t=[3 . . . 4): As was previously mentioned, portion 4 was already stored to the storage device as shown in FIG. 1b. At time t=[3 . . . 4), portion 4 is retrieved from the storage device and displayed to the monitor while portion 7 is saved to the storage device.

FIG. 3F shows pictorially what the hardware does during the fifth time interval t=[4 . . . 5): The portion 5 is retrieved from the storage device and displayed to the monitor.

FIG. 3G shows pictorially what the hardware does during the sixth time interval t=[5 . . . 6): The portion 6 is retrieved from the storage device and displayed to the monitor.

FIG. 3H shows pictorially what the hardware does during the seventh time interval t=[6 . . . 7): The portion 7 is retrieved from the storage device and displayed to the monitor.

Thus, if a user accesses the 3 channels at time t=0 (or up to one time interval before t=0), the user is able to view the entire data segment by recording portions of the data segment while other portions are being displayed. A data flow manager handles the routing of the portions of the data segment from the multiple channels to and from the storage unit, and to the output device.

FIGS. 4A–4H show pictorially what the hardware does to access the same data segment of FIGS. 3A–3H one time interval later, i.e., starting at time t=1. Although the data being provided on the channels at time t=1 is the same as in FIG. 3A, the sequence of buffering the portions of the data segment on the different channels varies from that of FIGS. 3A. This is because the portions of the data segment have a different timing relationship to one another. For example, for time t=[1 . . . 2), in the sequence of FIG. 3C, portion 5 is stored to the hard disk, while portion 2 is displayed. In FIG. 4B, portion 2 is recorded while portion 1 is displayed. The portion being displayed is dictated by the starting time of the data segment being accessed.

In the previous description, only one channel is recorded at a time. Another embodiment allows multiple channels to be recorded at the same time. For example, in FIG. 3B, portion 1 and 4 can be saved to the storage device during t=[0 . . . 1). As shown in FIG. 3C, portion 2 and 5 can be saved to the storage device during t=[1 . . . 2), and as shown in FIG. 3D, portion 3 and 6 can both be saved to the storage device during t=[2 . . . 3). In this manner, combined with the other time periods which need only save a portion from a single channel, the storage device can store the entire data segment. In one embodiment, once all or portions of the data segment are stored on the storage device, the near on demand system 100 is able to access the data segment immediately on future accesses.

FIG. 5A–5H show pictorially what the hardware does to access the same data segment of FIGS. 3A–3H two intervals later, i.e., starting at time t=2. Similarly, FIGS. 6A–6H show how the same data segment is handled by the hardware starting at time t=3. The data segment starting at time t=4 would be similar to FIGS. 3A–3H, and so forth. Thus, a data segment may be accessed from the three channels every interval time T.

Using the above example, for a two hour movie, the time interval T is equal to 2 hours divided by the 7 time intervals taken to view the movie. This amounts to 17 minutes and 8 seconds, which is approximately 2.33 times better in terms of access latency than that which would be provided by the prior art method or using three channels to provide the entire data segment every 40 minutes.

Tables 1, 2 and 3 show the approximate gains in access time latency using the present invention versus using the same number of channels to provide the entire data segment as in the prior art.

TABLE 1

| Channels | Best Channel Lengths and Phase Information (length.phase), rec = 1 tune = 2 | | | | | | | | | TOTAL portions | Gain | 2 hr max wait (HMS) |
|---|---|---|---|---|---|---|---|---|---|---|---|---|
| 1  | 1.0 |     |     |     |     |     |     |     |     |     | 1  | 1.00 | 2:00:00 |
| 2  | 1.0 | 2.0 |     |     |     |     |     |     |     |     | 3  | 1.50 | 0:40:00 |
| 3  | 1.0 | 2.0 | 2.1 |     |     |     |     |     |     |     | 5  | 1.67 | 0:24:00 |
| 4  | 1.0 | 2.0 | 2.1 | 4.1 |     |     |     |     |     |     | 9  | 2.25 | 0:13:20 |
| 5  | 1.0 | 2.0 | 2.1 | 4.1 | 4.3 |     |     |     |     |     | 13 | 2.60 | 0:09:13 |
| 6  | 1.0 | 2.0 | 2.1 | 4.1 | 4.3 | 4.2 |     |     |     |     | 17 | 2.83 | 0:07:03 |
| 7  | 1.0 | 2.0 | 2.1 | 4.1 | 4.3 | 4.2 | 4.0 |     |     |     | 21 | 3.00 | 0:05:42 |
| 8  | 1.0 | 2.0 | 2.1 | 4.1 | 4.3 | 4.2 | 4.0 | 8.3 |     |     | 29 | 3.63 | 0:04:08 |
| 9  | 1.0 | 2.0 | 2.1 | 4.1 | 4.3 | 4.2 | 4.0 | 8.3 | 8.7 |     | 37 | 4.11 | 0:03:14 |
| 10 | 1.0 | 2.0 | 2.1 | 4.1 | 4.3 | 4.2 | 4.0 | 8.3 | 8.7 | 8.7 | 45 | 4.50 | 0:02:40 |

TABLE 2

| Channels | Best Channel Lengths and Phase Information (length.phase), rec = 2 tune = 2 | | | | | | | | | TOTAL | Gain | 2 hr max wait (HMS) |
|---|---|---|---|---|---|---|---|---|---|---|---|---|
| 1  | 1.0 |     |     |     |     |     |     |     |     |     | 1  | 1.00 | 2:00:00 |
| 2  | 1.0 | 2.0 |     |     |     |     |     |     |     |     | 3  | 1.50 | 0:40:00 |
| 3  | 1.0 | 2.0 | 4.1 |     |     |     |     |     |     |     | 7  | 2.33 | 0:17:08 |
| 4  | 1.0 | 2.0 | 4.1 | 4.3 |     |     |     |     |     |     | 11 | 2.75 | 0:10:54 |
| 5  | 1.0 | 2.0 | 4.1 | 4.3 | 6.2 |     |     |     |     |     | 17 | 3.40 | 0:07:03 |
| 6  | 1.0 | 2.0 | 4.1 | 4.3 | 6.2 | 6.4 |     |     |     |     | 23 | 3.83 | 0:05:13 |
| 7  | 1.0 | 2.0 | 4.1 | 4.3 | 6.2 | 6.4 | 6.0 |     |     |     | 29 | 4.14 | 0:04:08 |
| 8  | 1.0 | 2.0 | 4.1 | 4.3 | 6.2 | 6.4 | 6.0 | 8.7 |     |     | 37 | 4.63 | 0:03:14 |
| 9  | 1.0 | 2.0 | 4.1 | 4.3 | 6.2 | 6.4 | 6.0 | 8.7 | 8.7 |     | 45 | 5.00 | 0:02:40 |
| 10 | 1.0 | 2.0 | 4.1 | 4.3 | 6.2 | 6.4 | 6.0 | 8.7 | 8.7 | 8.7 | 53 | 5.30 | 0:02:15 |

TABLE 3

| Channels | Best Channel Lengths and Phase Information (length.phase), rec = channels, tune = channels | | | | | | | | | TOTAL portions | Gain | 2 hr max wait (HMS) |
|---|---|---|---|---|---|---|---|---|---|---|---|---|
| 1  | 1.0 |     |     |     |      |      |      |       |       |       | 1    | 1.00 | 2:00:00 |
| 2  | 1.0 | 2.0 |     |     |      |      |      |       |       |       | 3    | 1.50 | 0:40:00 |
| 3  | 1.0 | 2.0 | 4.0 |     |      |      |      |       |       |       | 7    | 2.33 | 0:17:08 |
| 4  | 1.0 | 2.0 | 4.0 | 8.0 |      |      |      |       |       |       | 15   | 3.75 | 0:08:00 |
| 5  | 1.0 | 2.0 | 4.0 | 8.0 | 16.0 |      |      |       |       |       | 31   | 6.20 | 0:03:52 |
| 6  | 1.0 | 2.0 | 4.0 | 8.0 | 16.0 | 32.0 |      |       |       |       | 63   | 10.5 | 0:01:54 |
| 7  | 1.0 | 2.0 | 4.0 | 8.0 | 16.0 | 32.0 | 64.0 |       |       |       | 127  | 18.1 | 0:00:56 |
| 8  | 1.0 | 2.0 | 4.0 | 8.0 | 16.0 | 32.0 | 64.0 | 128.0 |       |       | 255  | 31.8 | 0:00:28 |
| 9  | 1.0 | 2.0 | 4.0 | 8.0 | 16.0 | 32.0 | 64.0 | 128.0 | 256.0 |       | 511  | 56.7 | 0:00:14 |
| 10 | 1.0 | 2.0 | 4.0 | 8.0 | 16.0 | 32.0 | 64.0 | 128.0 | 256.0 | 512.0 | 1023 | 102  | 0:00:07 |

Depending on the hardware used, two or more channels can be received or tuned at the same time ("tune" in Tables 1–3), and one or more channels can be recorded at the same time ("rec" in Tables 1–3). While one embodiment may actually tune to different channels, an alternate embodiment may de-multiplex channels from a data stream containing two or more channels. In this alternate embodiment, the "tuned" numbers would refer to the number of channels that could be simultaneously de-multiplexed. Other methods of simultaneously providing multiple channels to the system are also possible. Table 1 shows information for a system which can tune two channels (tune=2) at a time, but can only record one of the channels at a time (rec=1). Table 2 shows information for a system which can tune two channels at a time, and can record both of the channels. Table 3 shows information for a system which can tune and record all of its channels.

Tables 1, 2, and 3 show that there are advantages to being able to record more than one channel at a time. However, with a minimum configuration that receives two channels and that can record one of the channels at a time, there is still a gain over the prior art method of providing the entire data segment over each channel.

Table 1 shows a best channel length set up using 1 to 10 channels for a system which can tune two channels at a time, but can only record one of the channels at a time. For a 1 channel implementation, there is no improvement over the prior art. However, using 2 channels, there is a 1.5 time improvement over the prior art in terms of access latency. Using 2 channels, the first channel provides the first portion (1 portion total) which is repeated. The second channel provides the second and third portions (2 portions total) which are repeated. Thus, there are 3 portions total, and the access latency is 40 minutes.

In Table 1, using 3 channels, there is a 1.67 time improvement in access time latency over the prior art. Channel 1 provides the first portion (1 portion total) which is repeated; channel 2 provides the second and third portions (2 portions total) that are repeated; and channel 3 provides the fourth and fifth portions (2 portions total) that are repeated.

In Table 1, using 4 channels, there is a 2.25 time improvement in access time latency over the prior art. Channel 1 provides the first portion (1 portion total) which is repeated; channel 2 provides the second and third portions (2 portions total) that are repeated; channel 3 provides the fourth and fifth portions (2 portions total) that are repeated; and channel 4 provides the sixth, seventh, eighth, and ninth (4 portions total) that are repeated.

In Table 1, because there is a limit to the number of channels that can be recorded at the same time, the number of portions which can be repeated on a given channel is restricted. Table 3, for example, does not have a restriction on the number of channels that can be recorded at the same time. Table 3 is thus able to double the number of portions per channel for each additional channel added.

Additionally, the order of the portions has to be structured in such a way that no matter at which time interval the data segment is accessed, the entire data segment will be able to be accessed in its entirety. For a system that is constrained by the number of channels that can be recorded, such as that of Table 1, the ordering of the portions is important. The portions of the data segment on a channel may need to be set up with a particular phase. A phase of X indicates that the portions are ordered sequentially, but rotated by X. For example, a 4-portion length of a data segment starting with portion 4 and having a phase of 0 is the sequence of portions (4, 5, 6, 7). A phase of 1 indicates the portions of the channel are ordered sequentially but rotated by one (e.g., 5, 6, 7, 4). A phase of 2 indicates the portions of the channel are ordered sequentially but rotated by two (e.g., 6, 7, 4, 5). A phase of 3 indicates the portions of the channel are ordered sequentially but rotated by three (e.g., 7, 4, 5, 6). A method of determining a proper order for the portions of the data segments and their phase relative to the channels has been determined. If the order is incorrectly set up, the entire data segment may not be accessible from all possible starting points with the desired access latency.

Tables 1, 2 and 3 show a length (the total number of portions on a channel) and the phase for the channel. FIG. 3A, 4A, 5A and 6A, for example, used a channel set up comprising three channels set up with length/phase of (1.0 2.0 4.1). This is easiest to see in FIG. 4A starting at time t=1.

A program which calculates the best length/phase set up for channels which are constrained by the number of channels that can be either tuned or recorded is attached in the Appendix. [Dennis, do you have a soft copy of the program?, Otherwise, I'll submit the hardcopy I have.]

FIG. 1 is a block diagram illustrating the hardware used for accessing a data segment provided over two or more channels. Receiver hardware receives the portions of the data segment over the two or more channels. In one embodiment, the receiver hardware may be a modem, a tuner, or a network interface.

From the receiver hardware, the two or more channels are separated. They are also optionally compressed at this step. A data flow manager routes the portions of the data segment to a storage unit or buffers the portions of the data segment to an output device such as an audio/video output. Decompression is performed if the data had been compressed in a previous step.

Figure 2:
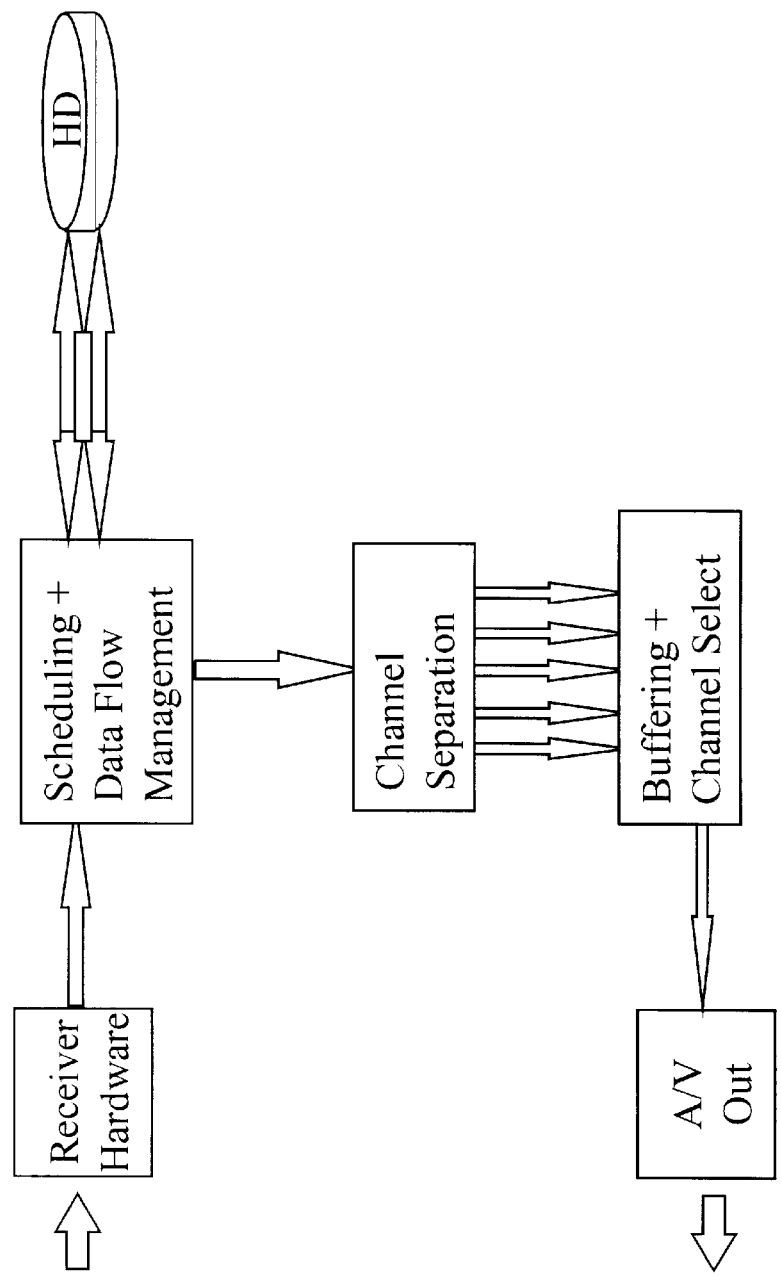
FIG. 2 is a block diagram illustrating an alternate embodiment of hardware used for accessing the data segment provided over two or more channels.

FIG. 2 is a block diagram illustrating an alternate embodiment of hardware used for accessing the data segment provided over two or more channels. In this case, the receiver hardware provides the portions of the data segment to a scheduler and data flow manager. The raw data is buffered to the hard disk as needed. The scheduler/data flow manager then provides the portions of the data segment to a subchannel separator, from which the separate portions of the data segment are buffered and selected to be provided at the audio/video output.

The present invention has many potential uses: For example, it can be used for near-on-demand movies that are provided over cable, or broadcast as Direct Broadcast Satellite (DBS) or Advanced TV (ATV). It can be used for providing music via the Internet, cable, DBS or ATV. It can provide news clips, text, or audio over the Internet.

Encryption can also be employed with the present invention. For example, all channels may be encrypted except for channel 1. Thus, non-subscribers to the broadcast service would be able to watch the first portion of a movie, for example, since it is not encrypted. However, the non-subscribers would not be able to view the encrypted portions. This provides a valuable "free preview" capability.

In one embodiment, a programmable computer is used for performing the various operations such as compression, decompression, scheduling/routing of portions of the data segment to the hard disk or the output device. Application software may be written to employ the techniques of the present invention. In other cases, the operating system of the computer may use the techniques present invention to lower access latency.

Figure 7:
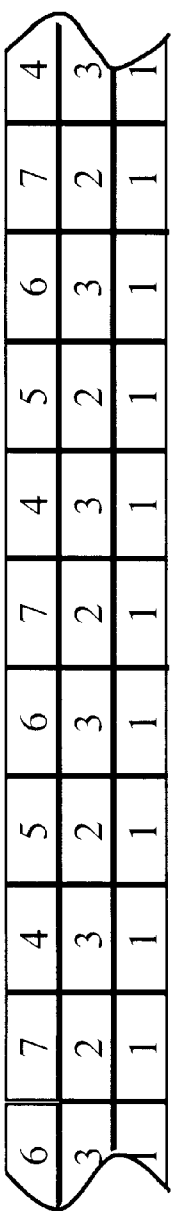
FIG. 7 shows an alternate embodiment, in which the two or more channels are not physical channels, but are logical channels which are time-multiplexed over a single physical channel.

FIG. 7 shows an alternate embodiment, in which the two or more channels are not physical channels. Instead, the two or more channels are logical channels that are time-multiplexed over a single physical channel. For example, a time-division multiplexed (TDM) signal that has a high compression could be used to provide a data segment to a user with minimal access latency.

Figure 8:
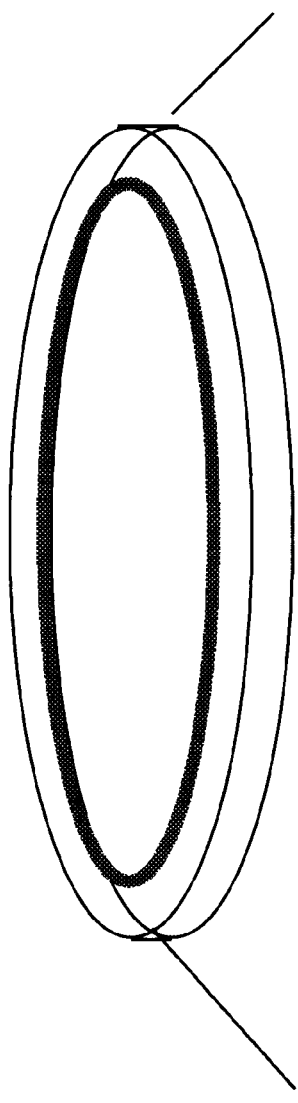
FIG. 8 shows an embodiment employing a time-division multiplexed (TDM) data segment using the techniques of the present invention to improve the access time to retrieve data from a storage medium such as a hard disk, or CD-ROM.

FIG. 8 shows an embodiment employing a TDM data segment using the techniques of the present invention to improve the access time to retrieve data from a storage medium such as a hard disk, or CD-ROM. Because of the circular nature of the medium, a head positioned on a particular track of a hard disk or CD-ROM, is able to access a data segment stored on the storage medium with a minimal access latency. The trade off is the storing of more data to the storage medium to allow for a faster access time, and the decrease in the rate at which the information is retrieved to M/N, where M is the bit rate of the storage device and N is the number of channels used. However, some implementations benefit from the increased access time achievable. Implementing the techniques of the present invention for storing and retrieving a TDM data segment to and from a storage medium, may be done via application software or via an operating system.

To illustrate how the techniques of the present invention can be applied, a normal access to a hard disk has an average access time of a seek time plus half a rotation period. In the worst case, the normal access to a hard disk is the seek time plus a full rotation period. Using four channels that are time-division multiplexed and stored on the hard disk, the average time to access the data is the seek time plus $\frac{1}{30}$ of a rotation period. The worst case is the seek time plus $\frac{1}{15}$ of the rotation period. (Table 3 shows a four channel case in which a data segment is divided into 15 portions. If the data segment is spread out equally over the entire length of the circular track, the data segment restarts every $\frac{1}{15}$ of a rotation. However, the data segment could be repeated multiple times to allow for a lower access latency.) A hard disk access could be improved by several milliseconds, assuming a rotation period of approximately 8.3 ms for a 7200 RPM hard drive. Similarly, for a 8X CD-ROM, a delay from rotation is 50 ms worst case, which can be reduced significantly using the techniques of the present invention.

Thus, a method of providing a data segment with minimal access latency is disclosed. The specific arrangements and methods described herein are merely illustrative of the principles of this invention. For example, the same method may be used to store and retrieve other types of data segments besides video segments. Numerous modifications in form and detail may be made without departing from the scope of the described invention. Although this invention has been shown in relation to a particular embodiment, it should not be considered so limited. Rather, the described invention is limited only by the scope of the appended claims.

APPENDIX

```
/*  this program, given the number of channels, the
 *  number of channels that can be simultaneously tuned
 *  or otherwise decoded, and the number of channels that
 *  can be simultaneously recorded, will determine a
 *  best possible division of a data segment among
 *  these channels and the phase relationship
 *  of each channel, for optimum near-on-demand access
 *
 *  the input for the program are read from the command line,
 *  and consists of an optional debugging switch "-d",
 *  followed by the number of channels transmitted,
 *  the number of channels that can be simultaneously
 *  recorded, and the number of channels that can be
 *  tuned, demultiplexed or otherwise decoded simultaneously.
 *
 *  the output will be a list of pairs, one for each channel
 *  that is used, in the form
 *  <channel_length_in_subsegments>:<channel_phase_in_subsegments>,
 *  which taken together express the layout of the segment
 *  within the channels. Phase is always relative to the
 *  start of the last channel, which is no shorter than
 *  any other channel and contains the latter subsegments
 *  of the original data segment.
 *
 *  the total number of subsegments used in also reported,
 *  as tlen. It is just the sum of the number of subsegments
 *  in each channel.
 *
 *  Note that for convenience of the programmer, the maximum
 *  number of channels this program will do an analysis
 *  for is limited to 16. It would be easy for anyone with
 *  good C programming skills to increase or eliminate this
 *  restriction if the need arose.
 *
 *  This software Copyright © 1997 by Intel Corporation.
 *
 *  The program was written for the C programming
 *  language. It has been succesfully compiled and
 *  executed on an IBM RISC System/6000 3BT computer
 *  running AIX, using the C compiler provided.
 *
 *  program written by Dennis M. O'Connor
 */
#include <stdio.h>
#include <signal.h>
int channels ;
int chan_phase[16] ;
int chan_length[ ] = { 1, 2, 4, 8, 16, 32, 64, 128,
            16, 16, 16, 16, 16, 16, 16, 16 } ;
int cum_lcm[16] ;
int poss_phase[16] ;
int chan_first_ival[16] ;
int slot_used[2048] ;   /* count number of times each slot used */
int direct_view[2048] ;  /* note when directly watching a channel */
void zero_stat_arrays( )
{
    int i ;
    for ( i=0; i<256; i++ ) {
      slot_used[i] = 0;
      direct_view[i] = 0 ;
    }
}
void init_chan_phases( )
{
    int i;
    chan_first_ival[0] = 1 ;
    for ( i = 0; i<channels; i++ ) {
      chan_phase[i] = 0;
      chan_first_ival[i+1] =
          chan_first_ival[i] + chan_length[i] ;
    }
}
int increment_chan_phases( )
```

APPENDIX-continued

```
{
    int cur_phase ; /* channel 0 always has only one phase */
    cur _phase = 1;
    while ( ( (++chan_phase[cur_phase]) >= poss_phas[cur_phase]
        && ( cur_phase < channels ) ) {
    chan_phase[cur_phase] = 0 ;
    cur_phase++ ;
    }
    return ( cur_phase < channels ) ;
}
int current_ival( int channel, int time)
{
    return chan_first_ival[channel] +
        ((chan_phase[channel] + time) % chan_length[channel]) ;
}
int segment_channel( int seg )
{
    int chan ;
    for ( chan = 0; chan < channels; chan++ ) {
      if ( seg >= chan_first_ival[chan] &&
        seg < (chan_first_ival[chan] + chan_length[chan])){
        return chan ;
      }
    }
    printf(" Error, channel not found for segment %i\n", seg );
    return 0 ;
}
int is_being_sent( int seg, int time )
{
    int chan ;
    for ( chan = 0; chan < channels; chan++ ) {
      if ( seg >= chan_first_ival[chan] &&
        seg < (chan_first_ival[chan] + chan_length[chan])){
        return ( seg == current_ival(chan, time ) ) ;
      }
    }
    return 0 ;
}
int gcd( int a, int b )
{
    if ( 0 == a ) return b ;
    if ( 0 == b ) return a ;
    if ( a > b ) {
      a = a % b ;
    }
    else {
      b = b % a ;
    }
    return gcd( a, b ) ;
}
int curbest_tlen ;
int curbest_lens[17] ;
int curbest_phas[17] ;
/* SIGINT is what we are looking for */
void int_handler( )
{
    int i ;
    for ( i = 0; i < channels; i++ ) {
      printf( " %2i", chan_length[i] ) ;
    }
    printf(" curbest_tlen = %i\n", curbest_tlen);
    signal( SIGINT, int_handler ) ;
    return ;
}
/* SIGQUIT is what we are looking for */
void quit_handler( )
{
    int i ;
    for ( i = 0; i < channels; i++ ) {
      printf( " %i:%i", curbest_lens[i], curbest_phase[i] ) ;
    }
    printf("   best len = %i\n", curbest_tlen);
    abort(0) ;
}
int main(int argc, char **argv)
{
    register int ix ;
    int stime ;
    int seg ;
```

APPENDIX-continued

```
int worst_tunes = 0;
int worst_records = 0;
int best_worst_tunes ;
int best_worst_records ;
int cur_phase_config ;
int best_phase_config ;
int flag ;
int debug = 0 ;
int lcm ;
int next_best ;
int next_best_count ;
int css ;
int rec_limit ;
int tune_limit ;
int sum ;
int vflag ;
int carry ;
/* generate a layout */
/* get number of channels and record/tune limits from the command line */
if ( argc < 4 ) {
  printf("error : missing parameters\n"
      "format: %s [-d] <chans><record><tune>[<int_chans>]\n",
      argv[0]) ;
  printf(" using default config: 4 channels, 2 rec/2 tune\n" );
  channels = 4 ;
  rec_limit = 2 ;
  tune_limit = 2 ;
  for ( ix = 0; ix < channels; ix++ ) {
    chan_length[ix] = 1 ;
  }
}
else {
  if ( 0 == strcmp( arg[1], "-d" ) ) {
    debug = 1 ;
  }
  channels = atoi( argv[1+debug] ) ;
  rec_limit = atoi( argv[2+debug] ) ;
  if ( argc > 3+debug ) {
    tune_limit = atoi( argv[3+debug] ) ;
  }
  else {
    tune_limit = rec_limit ;
  }
  if ( argc == 4+debug+channels ) {
    for ( ix = 0; ix < channels && ix < 16 ; ix++ ) {
      chan_length[ix] = atoi( argv[4+debug+ix] ) ;
    }
  }
  else {
    for ( ix = 0; ix < channels && ix < 16 ; ix++ ) {
      chan_length[ix] = 1 ;
    }
  }
}
if( channels > 16 ) {
  printf( "Sorry, too many channels, limit is 16\n" ) ;
  return 1 ;
}
if ( tune_limit > channels ) {
  printf ("Sorry, can't need more tuners than channels\n" );
  return 1 ;
}
if ( tune_limit < rec_limit ) {
  printf( "Sorry, can't need to record more than you tune \n" );
  return 1 ;
}
printf( " channels= %i, record limit= %i, tuner limit= %i\n",
      channels, rec_limit, tune_limit ) ;
/* rules for finding the best :
 * 1. a channel can't be longer than 1+sum(prev_channel)
 * 2. Don't try a combo is total length shorter than current best
 */
curbest_tlen = 0 ;
signal( SIGINT, int_handler ) ;
signal( SIGQUIT, quit_handler ) ;
do {
  best_worst_records = channels + 1;
  best_worst_tunes = channels + 1 ;
  init_chan_phases( ) ;
```

APPENDIX-continued

```
/* Layout is just phase information for each channel. */
/* determine repeat ival: LCM of all channel lengths */
/* also, determine number of phases we need to try
    for each channel. This will be the lesser of
    the LCM of all previous channels (the interval
    at which they repeat) and the length of the channel. */
cum_lcm[0] = chan_length[0] ;
poss_phas[0] = 1 ;
for ( ix = 1; ix < channels; ix++ ) {
cum_lcm[ix] = ( cm_lcm[ix-1] * chan_length[ix] ) /
 gcd( cm_lcm[ix-1], chan_length[ix] ) ;
poss_phas[ix] = ( cum_lcm[ix-1] < chan_length[ix] ?
            cum_lcm[ix-1] : chan_length[ix] ) ;
}
lcm = cum_lcm[channels-1] ;
/* LCM is beat ival UNLESS it is less than the total time ? */
cur_phase_config = 0 ;
do {
    /* note phases in output */
    if ( debug ) {
      for( ix = 0; ix < channels; ix++ ) {
         printf( "%3i ", chan_phase[ix] ) ;
      }
      printf(" : ");
      for( ix = 0; ix < channels; ix++ ) {
         printf( "%3i ", current_ival(ix, 0) ) ;
      }
      printf("\n");
    }
    /* these two stats are per-phase-set */
    worst_tunes = 0;
    worst_records = 0;
    /* analyze versus all possible start times */
    /* hueristic: recard segement in earliest unassigned slot */
    for ( stime = 0; stime < lcm ; stime++ ){
      zero_stat_arrays( );
      for (seg = chan_first_ival[channels]-1; seg > 0; --seg) {
          /* figure out when the segment is recorded or viewed */
          int seg_chan = segment_channel( seg ) ;
          int chan_len = chan_length[seg_chan] ;
          next_best_count = channels+1 ; /* findi min, start high */
          if ( seg == (css = current_ival( seg_chan, stime+seg-1 ))){
            direct_view[seg] = 1 ;
          }
          else {
            flag = 0;
            for ( ix = chan_len - ((chan_len+seg-css) % chan_len);
               ix < seg && flag == 0;
               ix += chan_len ) {
              if ( debug &&
                seg != current_ival( seg_chan,
                        stime+seg-(ix+1))) {
                 printf( "Program Error, check 1 !") ;
              }
              if ( slot_used[seg-ix] == 0 ) {
                 flag = 1 ;
                 slot_used[seg-ix] = 1 ;
              }
              else if ( slot_used[seg-ix] < next_best_count ) {
                 next_best = seg-ix ;
                 next_best_count = slot_used[seg-ix] ;
              }
            }
            if ( 0 == flag ) {
               if ( 0 != next_best ) {
                  slot_used[next_best]++ ;
               }
               else {
                  printf( "Error, couldn't get seg % 3i\n", seg );
               }
            }
          }
      }
      /* scan for worst cases */
      for (seg = chan_first_ival[channels]-1; seg > 0; --seg) {
          if ( slot_used[seg] > worst_records )
             worst_records = slot_used[seg] ;
          if ( slot_used[seg]+direct_view[seg] > worst_tunes )
             worst_tunes = slot_used[seg]+direct_view[seg] ;
```

APPENDIX-continued

```
       }
    /* if the worst case for __any__ start time is worse
        than what we are looking for, don't bother checking
        for the remaining start times ! */
    if ( worst_records > rec_limit ||
            worst_tunes > tune_limit ) {
        break ;
    }
    /* diagnostic/data printout */
    if ( debug ) {
    printf( "start=%2i, ", stime ) ;
    for ( seg = 1; seg<chan_first_ival[channels]; seg++ ) {
     printf( "%c%1i ",
            (direct_view[seg] ? 'V' : ' '),
            slot_used[seg] ) ;
     }
     printf( " mxrec=%1i mxtun=%1i\n",
            worst_records, worst_tunes ) ;
    }
  }
  if ( worst_records < best_worst_records ) {
    best_worst_records = worst_records ;
  }
  if ( best_worst_records == worst_records &&
    worst_tunes < best_worst_tunes ) {
    best_worst_tunes = worst_tunes ;
    best_phase_config = cur_phase_config ;
  }
  cur_phase_config++ ;
  /* stop if target case achieved by this phase config */
  if ( rec_limit >= best_worst_records &&
    tune_limit >= best_worst_tunes ) {
    /* found a new best arrangement */
    if ( debug ) printf( "new best qualifying\n" ) ;
    curbest_tlen = 0 ;
    for( ix = 0; ix < channels; ix++ ) {
        curbest_lens[ix] = chan_length[ix] ;
        curbest_phas[ix] = chan_phase[ix] ;
        curbest_tlen += chan_length[ix] ;
    }
    break ;
   }
  } while ( increment_chan_phases( ) ) ;
 /* now, generate new potentially-better channel array */
 /* count, but not more aggresively than 2^N, and
    if it isn't valid ( no channel longer than 1+prev_sum)
    or if it isn't longer than the best yet, reject it */
 /* + later channels should be as long or longer than earlier ones */
 do {
   sum = 1 ; vflag = 0; carry = 1 ;
   for ( ix = 1; ix < channels; ix++ ) {
    chan_length[ix]+= carry ;
    if ( chan_length[ix] > ( 1 << ix ) ) {
            chan_length[ix] = 1 ;
            carry = 1 ;
    }
    else {
       carry = 0 ;
    }
    if ( chan_length[ix] > sum+1 ||
        chan_length[ix] < channel_length[ix-1]) {
        vflag = 1 ;
    }
    sum += chan_length[ix] ;
   }
  } while ( ( 1 == vflag || sum <= curbest_tlen ) && 0 == carry ) ;
  } while ( 0 == carry ) ;
  for ( ix = 0; ix < channels; ix++ ) {
    printf( "%2i:%1i", curbest_lens[ix], curbest_phase[ix] ) ;
  }
  printf( " tlen=%3i\n", curbest_tlen ) ;
  return 0 ;
}
```

What is claimed is:

1. A method of providing a data segment, the method comprising the steps of:
   (a) dividing the data segment into three or more portions; and
   (b) providing the data segment via two or more channels, each of the two or more channels carrying a portion of the data segment, each of the portions carried by the two or more channels being less than the entire data segment, each of the two or more channels repeating over time.

2. The method of claim 1 wherein a first channel of the two or more channels has a first length, and a second channel of the two or more channels has a second length, wherein the second length is twice as long as the first length.

3. The method of claim 1 wherein a first channel of the two or more channels has a first length, a second channel of the two or more channels has a second length, and a third channel of the two or more channels has a third length, wherein the second length is twice as long as the first length, and the third length is four times as long as the first length.

4. The method of claim 1 wherein the two or more channels are logical channels which are time-multiplexed over a single physical channel.

5. A method of providing a data segment, the method comprising the steps of:
   (a) providing a first portion of the data segment over a first channel that repeats at an interval T;
   (b) providing a second portion of the data segment over a second channel that repeats at the interval T times a multiplier X, wherein X is an integer.

6. The method of claim 5 wherein the first channel and the second channel are logical channels which are time-multiplexed over a single physical channel.

7. The method of claim 5, wherein X is 2.

8. The method of claim 7 further comprising the steps of:
   (c) providing a third portion of the data segment over a third channel that repeats at the interval T times a multiplier Y, wherein Y is an integer.

9. The method of claim 8 wherein the first channel and the second channel are logical channels which are time-multiplexed over a single physical channel.

10. The method of claim 8, wherein Y is 4.

11. The method of claim 10 further comprising the steps of:
    (d) providing a fourth portion of the data segment over a fourth channel that repeats at the interval T times a multiplier Z, wherein Z is an integer.

12. The method of claim 11, wherein Z is 8.

13. A method of providing a data segment, the method comprising the steps of:
    (a) providing a first portion of the data segment over a first channel that repeats at a first frequency;
    (b) providing a second portion of the data segment over a second channel that repeats at a second frequency, wherein the second frequency is less frequent than the first frequency; and
    (c) providing a third portion of the data segment over a third channel that repeats at a third frequency, wherein the third frequency is less frequent than the second frequency.

14. The method of claim 13, wherein the first channel, the second channel, and the third channel are logical channels which are time-multiplexed over a single physical channel.

15. A method of accessing a data segment, the data segment having a beginning and an end, the method comprising the steps of:
    (a) receiving the data segment on two or more channels, each of the two or more channels carrying a portion of the data segment that is less than the entire data segment from the beginning to the end, each of the two or more channels repeating its portion of the data segment over time;
    (b) providing the entire data segment from the beginning to the end at an output by retrieving the portions of the data segment from the two or more channels.

16. A method of accessing a data segment, the data segment having a beginning and an end, the method comprising the steps of:
    (a) receiving at least a portion of the data segment over each of N channels, each of the N channels repeating at a time interval times a multiplier M, wherein N is an integer greater than 1, and M is an integer greater than 0;
    (b) providing at an output the data segment from the beginning to the end, wherein each of the N channels provides at least part of the data segment to the output.

17. The method of claim 16, wherein the step (b) further comprises the step of:
    (b) buffering to a storage unit a second portion of the data segment received from one of the N channels prior to providing the second portion of the data segment to the output.

18. The method of claim 16 wherein each of the N channels are logical channels which are time-multiplexed over a single physical channel.

19. A storage medium comprising:
    a first portion of a data segment stored on a first channel, the first portion being repeated on the first channel at a first frequency;
    a second portion of the data segment stored on a second channel, the second portion being repeated on the second channel at a second frequency, the second frequency being less frequent than the first frequency; and
    a third portion of the data segment stored on a third channel, the third portion being repeated on the third channel at a third frequency, the third frequency being less frequent than the first frequency.

20. The storage medium of claim 19 wherein the first channel, the second channel, and the third channel are physical channels.

21. The storage medium of claim 19 wherein the first channel, the second channel, and the third channel are logical channels which are time-multiplexed over a single physical channel.

22. The storage medium of claim 21 wherein the single physical channel is on a circular track of the storage medium.

23. The method of claim 1 wherein a first channel of the two or more channels has a first length, and a second channel of the two or more channels has a second length, wherein the second length is at least twice as long as the first length.

24. The method of claim 1 wherein a first channel of the two or more channels has a first length, a second channel of the two or more channels has a second length, and a third channel of the two or more channels has a third length, wherein the second length is at least twice as long as the first length, and the third length is at least four times as long as the first length.

* * * * *

UNITED STATES PATENT AND TRADEMARK OFFICE
CERTIFICATE OF CORRECTION

PATENT NO.    : 6,072,808
DATED         : June 6, 2000
INVENTOR(S)   : O'Connor

It is certified that error appears in the above-identified patent and that said Letters Patent is hereby corrected as shown below:

Column 3,
Line 5, delete "he", insert -- the --.

Column 4,
Line 34, delete "portion", insert -- portions --.
Line 36, delete "portion", insert -- portions --.

Column 8,
Line 18, after "techniques", insert -- of the --.

Signed and Sealed this

Seventeenth Day of December, 2002

JAMES E. ROGAN
*Director of the United States Patent and Trademark Office*